(12) United States Patent
Miyazoe et al.

(10) Patent No.: US 10,174,771 B2
(45) Date of Patent: Jan. 8, 2019

(54) DUAL 4-PORT ELECTROMAGNETIC VALVE

(71) Applicant: SMC CORPORATION, Chiyoda-ku (JP)

(72) Inventors: Shinji Miyazoe, Moriya (JP); Shinichi Yoshimura, Moriya (JP); Takashi Murakami, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 134 days.

(21) Appl. No.: 15/507,926

(22) PCT Filed: Aug. 4, 2015

(86) PCT No.: PCT/JP2015/072009
§ 371 (c)(1),
(2) Date: Mar. 1, 2017

(87) PCT Pub. No.: WO2016/035495
PCT Pub. Date: Mar. 10, 2016

(65) Prior Publication Data
US 2017/0292541 A1  Oct. 12, 2017

(30) Foreign Application Priority Data
Sep. 4, 2014 (JP) ................................. 2014-180677

(51) Int. Cl.
*F15B 13/08* (2006.01)
*F16K 11/24* (2006.01)
(Continued)

(52) U.S. Cl.
CPC ...... *F15B 13/0814* (2013.01); *F15B 13/0842* (2013.01); *F16K 11/07* (2013.01);
(Continued)

(58) Field of Classification Search
CPC ..... Y10T 137/86574; Y10T 137/86582; Y10T 137/86622; Y10T 137/8671;
(Continued)

(56) References Cited

U.S. PATENT DOCUMENTS 3,874,405 A * 4/1975 Thayer ................ F15B 13/0438
137/596.16
4,290,449 A * 9/1981 Budzich .............. F15B 13/0416
137/596.13
(Continued)

FOREIGN PATENT DOCUMENTS

JP 56-47971 U 4/1981
JP 62-2873 U 1/1987
(Continued)

OTHER PUBLICATIONS

International Search Report dated Oct. 20, 2015, in PCT/JP2015/072009 filed Aug. 4, 2015.

*Primary Examiner* — Mary McManmon
*Assistant Examiner* — Patrick Williams
(74) *Attorney, Agent, or Firm* — Oblon, McClelland, Maier & Neustadt, L.L.P.

(57) ABSTRACT

[Object] To provide a compact, rationally designed, dual 4-port electromagnetic valve that is an electromagnetic valve having functions of two 4-port valves.
[Solution] A dual 4-port electromagnetic valve includes two spools (8a, 8b) slidable independently of each other in a valve hole (7); two pilot valves (4a, 4b) that drive the two spools, respectively; a main supply port (P) that communicates with the valve hole (7) at a position where the two spools face each other; first and second output ports (A1, A2) that communicate with the valve hole (7) on two respective sides of the main supply port (P), first and second discharge ports (E1, E2) that communicate with the valve hole (7) on two respective outer sides of the output ports (Continued)

(A1, A2), third and fourth output ports (B1, B2) that communicate with the valve hole (7) on two respective outer sides of the discharge ports (E1, E2), and first and second supply ports (P1, P2) that communicate with the valve hole (7) on two respective outer sides of the output ports (B1, B2). The main supply port (P) and each of the first and second supply ports (P1, P2) communicate with each other.

8 Claims, 12 Drawing Sheets (51) Int. Cl.
*F16K 11/20* (2006.01)
*F16K 31/383* (2006.01)
*F16K 27/00* (2006.01)
*F16K 11/07* (2006.01)
*F16K 27/04* (2006.01)
*F16K 31/00* (2006.01)
*F16K 31/42* (2006.01)

(52) U.S. Cl.
CPC ............ *F16K 11/207* (2013.01); *F16K 11/24* (2013.01); *F16K 27/00* (2013.01); *F16K 27/04* (2013.01); *F16K 31/383* (2013.01); *F16K 31/426* (2013.01); *F16K 31/00* (2013.01); *Y10T 137/86574* (2015.04); *Y10T 137/86582* (2015.04); *Y10T 137/86622* (2015.04)

(58) Field of Classification Search
CPC .. F15B 13/0814; F15B 13/0842; F16K 11/24; F16K 11/207; F16K 31/426; F16K 11/07; F16K 27/00; F16K 27/04; F16K 31/383; F16K 31/00
See application file for complete search history.

(56) References Cited

U.S. PATENT DOCUMENTS

| | | | | |
|---|---|---|---|---|
| 4,617,854 A | * | 10/1986 | Kropp | ................... E02F 9/2225 |
| | | | | 60/422 |
| 5,471,839 A | * | 12/1995 | Hirata | ..................... F15B 13/06 |
| | | | | 137/596.13 |
| 6,283,149 B1 | * | 9/2001 | Hayashi | .............. F15B 13/0402 |
| | | | | 137/554 |
| 7,306,009 B2 | * | 12/2007 | Harvey | ................. F15B 11/036 |
| | | | | 137/312 |
| 2004/0089352 A1 | | 5/2004 | Hayashi et al. | |

FOREIGN PATENT DOCUMENTS

| | | |
|---|---|---|
| JP | 4-66468 U | 6/1992 |
| JP | 11-218253 A | 8/1999 |
| JP | 11-230375 A | 8/1999 |
| JP | 2004-156719 A | 6/2004 |

* cited by examiner

DUAL 4-PORT ELECTROMAGNETIC VALVE

TECHNICAL FIELD

The present invention relates to a dual 4-port electromagnetic valve having functions of two 4-port valves.

BACKGROUND ART

Hitherto, if a plurality of electromagnetic valves is used as one unit, the plurality of electromagnetic valves is mounted on a manifold, whereby a manifold electromagnetic valve is obtained, in general. In such a case, to efficiently mount as many electromagnetic valves as possible on a manifold, two electromagnetic valves arranged face to face are paired, and a plurality of such pairs of electromagnetic valves are arranged side by side on a manifold, as disclosed by, for example, PTL 1. Thus, the length of such a manifold electromagnetic valve can be reduced to about half the length of the same number of electromagnetic valves that are arranged side by side in one line on a manifold.

However, a pair of electromagnetic valves that are arranged face to face projects by a large length from the manifold in the width direction. Therefore, the width of a manifold electromagnetic valve tends to be large, leading to a problem in that, for example, it is difficult to place such a manifold electromagnetic valve if the site for placing the valve is limited.

Although the electromagnetic valve disclosed by PTL 1 is a 3-port valve, the above problem also applies to 4-port valves. A 4-port valve has a greater number of ports and has a correspondingly longer valve body than a 3-port valve. Therefore, a pair of 4-port valves that are arranged face to face has a longer total length than a pair of 3-port valves that are arranged face to face, further increasing the size of the manifold electromagnetic valve.

CITATION LIST

Patent Literature

PTL 1: Japanese Unexamined Patent Application Publication No. 2004-156719

SUMMARY OF INVENTION

Technical Problem

It is an object of the present invention to provide a compact, rationally designed, dual 4-port electromagnetic valve that is an electromagnetic valve having functions of two 4-port valves so as to be suitable for use on a base member such as a manifold or a sub-plate.

Solution to Problem

To solve the above problem, a dual 4-port electromagnetic valve according to the present invention includes one valve hole provided in a valve body; a first spool and a second spool that are housed in the valve hole in such a manner as to be slidable independently of each other; a first pilot valve and a second pilot valve that are of a solenoid-operated type and drive the first spool and the second spool, respectively, with an action of pilot fluid; a main supply port that communicates with the valve hole at a position where the first spool and the second spool face each other; a first output port and a second output port that communicate with the valve hole on two respective sides of the main supply port; a first discharge port and a second discharge port that communicate with the valve hole on two respective outer sides of the first output port and the second output port; a third output port and a fourth output port that communicate with the valve hole on two respective outer sides of the first discharge port and the second discharge port; and a first supply port and a second supply port that communicate with the valve hole on two respective outer sides of the third output port and the fourth output port. The main supply port and each of the first supply port and the second supply port communicate with each other.

Positions of the first spool and the second spool each include a first switching position taken when a corresponding one of the first pilot valve and the second pilot valve is not powered, and a second switching position taken when the corresponding one of the first pilot valve and the second pilot valve is powered.

When the first spool is at the first switching position, the main supply port communicates with the first output port, the third output port communicates with the first discharge port, and the first supply port is closed. Whereas, when the first spool is at the second switching position, the main supply port is closed, the first output port communicates with the first discharge port, and the first supply port communicates with the third output port.

When the second spool is at the first switching position, the main supply port communicates with the second output port, the fourth output port communicates with the second discharge port, and the second supply port is closed. Whereas, when the second spool is at the second switching position, the main supply port is closed, the second output port communicates with the second discharge port, and the second supply port communicates with the fourth output port.

In the present invention, a return pressure chamber that is shared between the first spool and the second spool is provided at a position where the valve hole communicates with the main supply port, and pistons on which pilot-fluid pressures from the first pilot valve and the second pilot valve act, respectively, are each provided at an end of a corresponding one of the first spool and the second spool on a side opposite a side facing the return pressure chamber.

Furthermore, the return pressure chamber forms a part of a passage that connects the main supply port and the first output port to each other and a part of a passage that connects the main supply port and the second output port to each other.

In the present invention, it is desirable that the first pilot valve be provided at one end of the valve body, the second pilot valve be provided at another end of the valve body, the first pilot valve communicate with the first supply port via a first pilot through hole, and the second pilot valve communicate with the second supply port via a second pilot through hole.

In the present invention, it is preferable that each pair of the first spool and the second spool, the first output port and the second output port, the first discharge port and the second discharge port, the third output port and the fourth output port, the first supply port and the second supply port, and the first pilot valve and the second pilot valve be arranged symmetrically to each other with respect to a virtual plane extending through a center of the main supply port and that is orthogonal to an axis of the valve hole.

According to a specific embodiment of the present invention, the first spool, the main supply port and the first supply port, the first output port and the third output port, the first discharge port, and the first pilot valve together form a first valve unit that is a 4-port valve; and the second spool, the main supply port and the second supply port, the second output port and the fourth output port, the second discharge port, and the second pilot valve together form a second valve unit that is a 4-port valve. Furthermore, the first valve unit and the second valve unit are provided on one side and another side, respectively, of the valve body while sharing the main supply port and with the main supply port positioned in between.

In the present invention, the first to fourth output ports are selectively closable. Furthermore, when one of the first output port and the third output port is closed, the first valve unit serves as a 3-port valve; and, when one of the second output port and the fourth output port is closed, the second valve unit serves as a 3-port valve.

Advantageous Effects of Invention

According to the present invention, one electromagnetic valve has functions of two 4-port valves by rationally incorporating a valve mechanism including two 4-port valves into one valve body. Therefore, the length of the electromagnetic valve can be made much shorter than in a case where two 4-port valves that are independent of each other are arranged face to face.

DESCRIPTION OF EMBODIMENTS

FIGS. 1 to 6 illustrate a dual 4-port electromagnetic valve according to a first embodiment of the present invention. An electromagnetic valve 1A according to the first embodiment is a direct-piping electromagnetic valve including a valve body 3 having output ports A1, A2, B1, and B2 to which pipes are directly connected, respectively. The electromagnetic valve 1A includes the valve body 3, and solenoid-operated first and second pilot valves 4a and 4b provided at one end and at another end, respectively, of the valve body 3.

Figure 1:
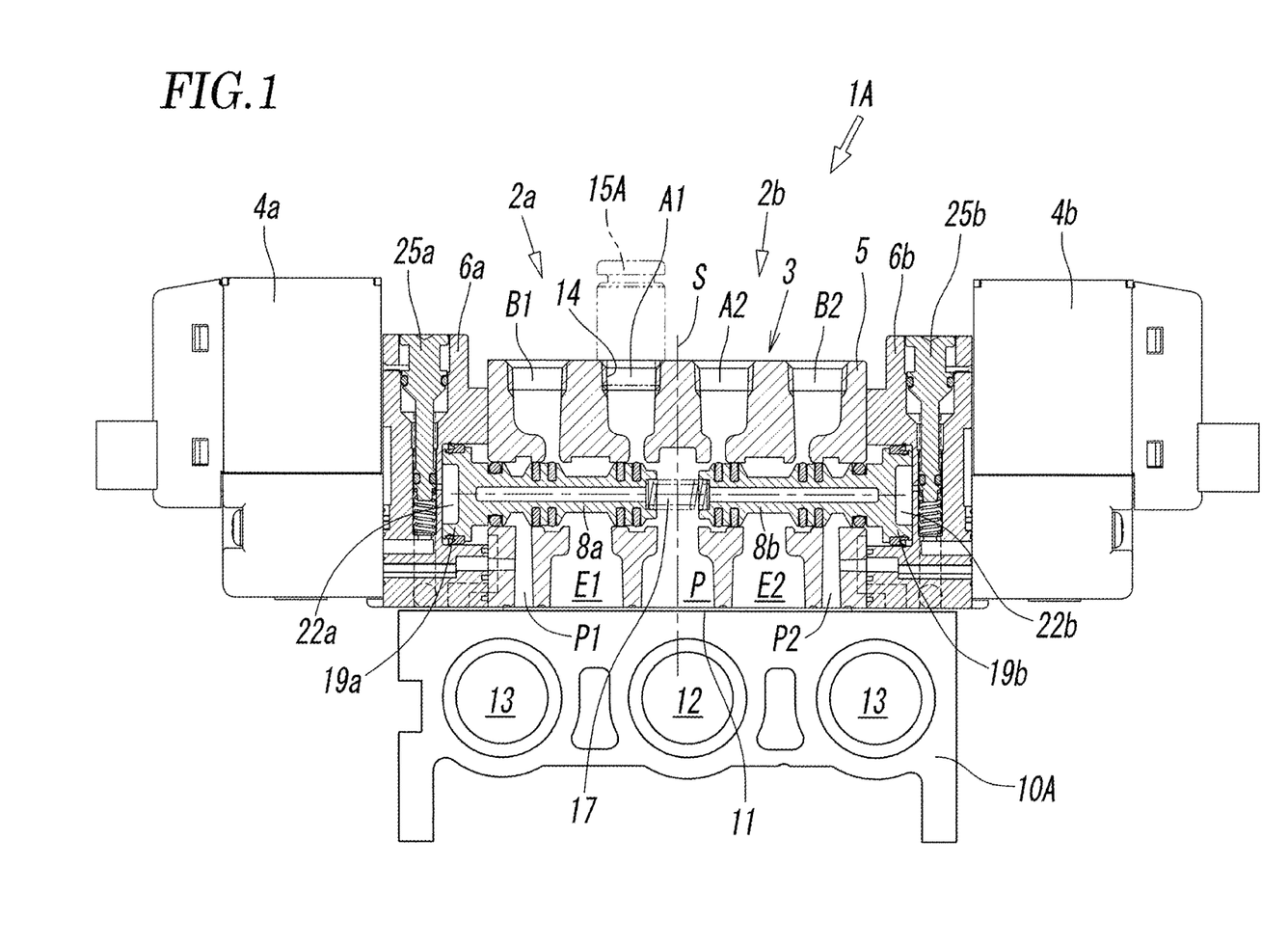
FIG. 1 is a sectional view of relevant elements of a dual 4-port electromagnetic valve according to a first embodiment of the present invention and illustrates a state where first and second pilot valves are not powered.
Figure 2:
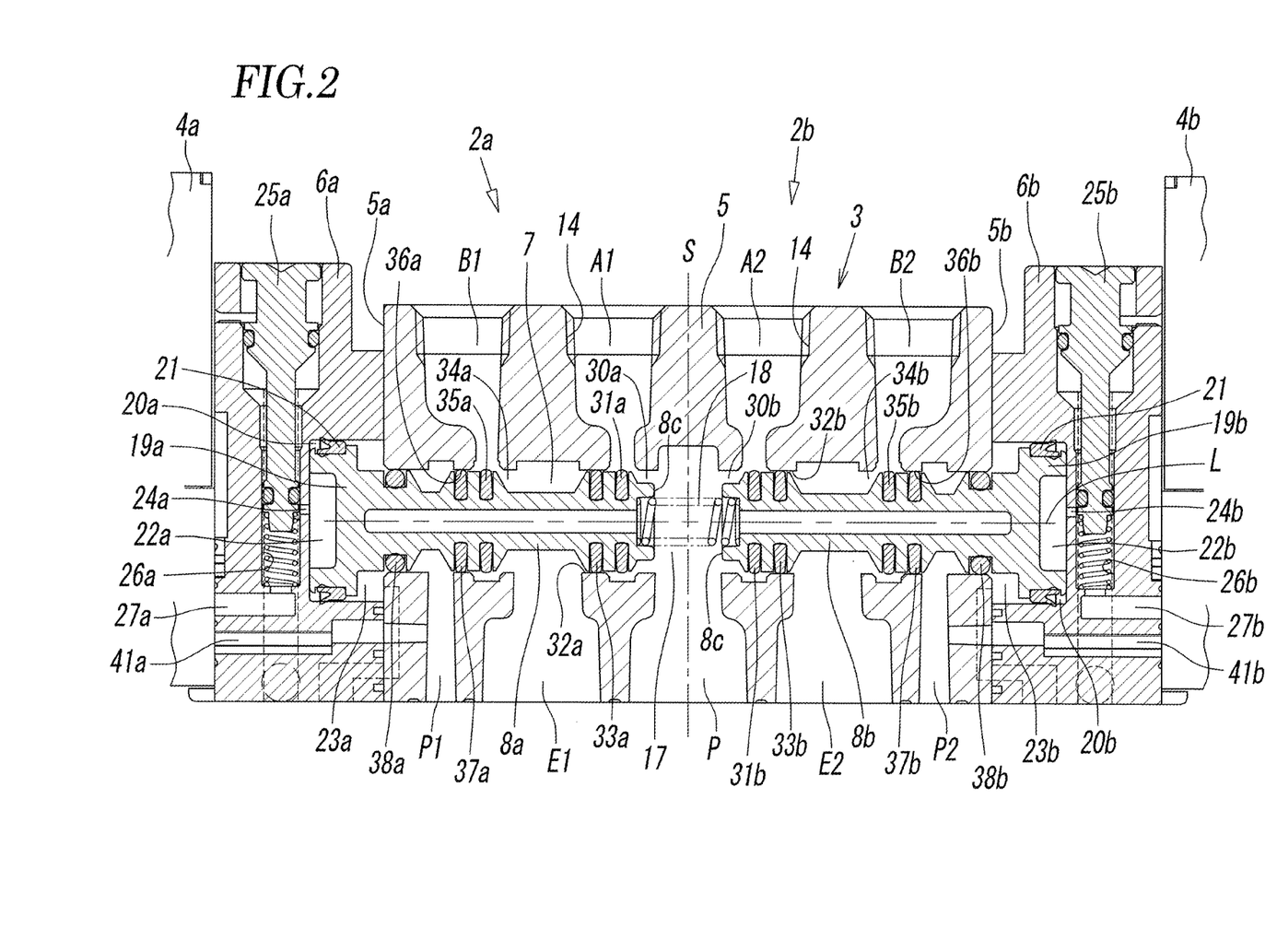
FIG. 2 is an enlargement of a part of the electromagnetic valve illustrated in FIG. 1.

The valve body 3 includes a main body 5 at the center thereof, a first adaptor 6a connected to a first end 5a of the main body 5, and a second adaptor 6b connected to a second end 5b on the opposite side thereof. The first pilot valve 4a is connected to the first adaptor 6a. The second pilot valve 4b is connected to the second adaptor 6b.

The main body 5 has thereinside a circular valve hole 7 extending linearly through the main body 5 from the first end 5a to the second end 5b. First and second spools 8a and 8b having the same configuration are provided in the valve hole 7, with leading-end surfaces 8c thereof facing each other. The first and second spools 8a and 8b are independently slidable in the direction of an axis L of the valve hole 7.

The main body 5 has a main supply port P that communicates with the valve hole 7 at a position where the leading-end surfaces 8c of the first and second spools 8a and 8b face each other, a first output port A1 and a second output port A2 that communicate with the valve hole 7 on two respective sides of the main supply port P, a first discharge port E1 and a second discharge port E2 that communicate with the valve hole 7 on two respective outer sides of the first output port A1 and the second output port A2, a third output port B1 and a fourth output port B2 that communicate with the valve hole 7 on two respective outer sides of the first discharge port E1 and the second discharge port E2, and a first supply port P1 and a second supply port P2 that communicate with the valve hole 7 on two respective outer sides of the third output port B1 and the fourth output port B2.

Figure 3:
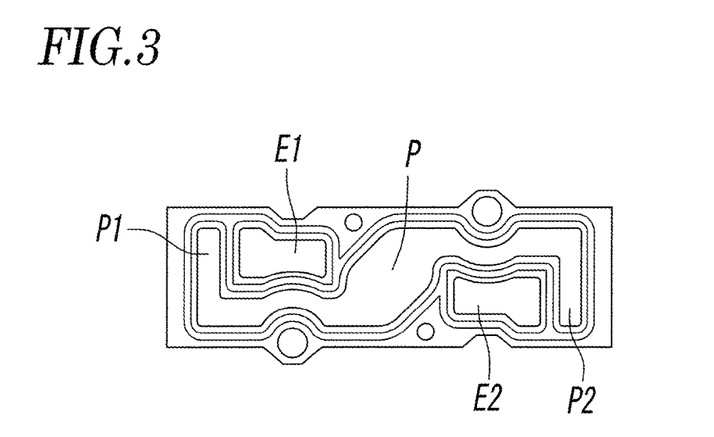
FIG. 3 is a bottom view of a main body forming a valve body of the electromagnetic valve illustrated in FIG. 1.

As can be seen from FIG. 3, the main supply port P and the first supply port P1 and the second supply port P2 are connected to one another by a communication passage 9 provided at the lower surface of the main body 5. When the electromagnetic valve 1A is mounted on a base member 10A such as a manifold or a sub-plate, the main supply port P and the first and second supply ports P1 and P2 are isolated from the first and second discharge ports E1 and E2 by a gasket 11 interposed between the electromagnetic valve 1A and the base member 10A. Hence, the main supply port P and the first and second supply ports P1 and P2 form one supply port having three branches each communicating with the valve hole 7.

Among the above ports, the first to fourth output ports A1, A2, B1, and B2 have respective openings in the upper surface of the main body 5, and the other ports P, P1, P2, E1, and E2 have respective openings in the lower surface of the main body 5. When the electromagnetic valve 1A is mounted on the base member 10A, the main supply port P and the first and second supply ports P1 and P2 communicate with a supply through hole 12 provided in the base member 10A, and the first and second discharge ports E1 and E2 communicate with two discharge through holes 13, respectively.

The first to fourth output ports A1, A2, B1, and B2 each have an internal thread 14 so that a publicly known quickconnecting pipe joint 15A can be screwed thereinto as represented for the first output port A1 by chain lines in FIG. 1. A flexible tube-type pipe is connected to each of the output ports A1, A2, B1, and B2 with the pipe joint 15A interposed therebetween.

A return pressure chamber 17 that communicates with the main supply port P is provided at a position of the valve hole 7 where the leading-end surfaces 8c of the first spool 8a and the second spool 8b face each other. Pressurized fluid that is introduced into the return pressure chamber 17 causes the first spool 8a and the second spool 8b to return to respective first switching positions illustrated in FIG. 1. The first switching positions are switching positions that are taken when the first and second pilot valves 4a and 4b are not powered.

While the drawings illustrate a case where a return spring 18 in a compressed state is interposed between concave spring seats provided in the respective leading-end surfaces 8c of the first spool 8a and the second spool 8b, the return spring 18 does not necessarily need to be provided.

The first spool 8a and the second spool 8b further include, at the trailing-end surfaces thereof that are opposite the leading-end surfaces 8c, respective pistons 19a and 19b having a larger diameter than the first and second spools 8a and 8b. The pistons 19a and 19b are housed in respective piston chambers 20a and 20b provided in the first and second adaptors 6a and 6b such that the pistons 19a and 19b are slidable therein with respective seal members 21 interposed therebetween. A pilot pressure chamber 22a or 22b and a release chamber 23a or 23b are provided on two respective sides of each of the pistons 19a and 19b.

The pilot pressure chambers 22a and 22b are connected to the respective pilot valves 4a and 4b via respective through holes 24a and 24b provided in the respective adaptors 6a and 6b, respective manual valve holes 26a and 26b that house respective manual valves 25a and 25b, and respective communicating holes 27a and 27b. When the pilot valves 4a and 4b are powered, pilot fluid is supplied from the pilot valves 4a and 4b to the pilot pressure chambers 22a and 22b. Then, the pilot fluid pushes the pistons 19a and 19b, and the spools 8a and 8b move forward to respective second switching positions (see FIG. 7).

The release chambers 23a and 23b are open to the outside via respective release holes that are not illustrated.

The first spool 8a is provided with a first seal member 31a that opens and closes a first supply passage 30a connecting the main supply port P and the first output port A1 to each other, a second seal member 33a that opens and closes a first discharge passage 32a connecting the first output port A1 and the first discharge port E1 to each other, a third seal member 35a that opens and closes a second discharge passage 34a connecting the third output port B1 and the first discharge port E1 to each other, a fourth seal member 37a that opens and closes a second supply passage 36a connecting the first supply port P1 and the third output port B1 to each other, and a fifth seal member 38a that isolates the first supply port P1 and the release chamber 23a from each other.

Figure 6:
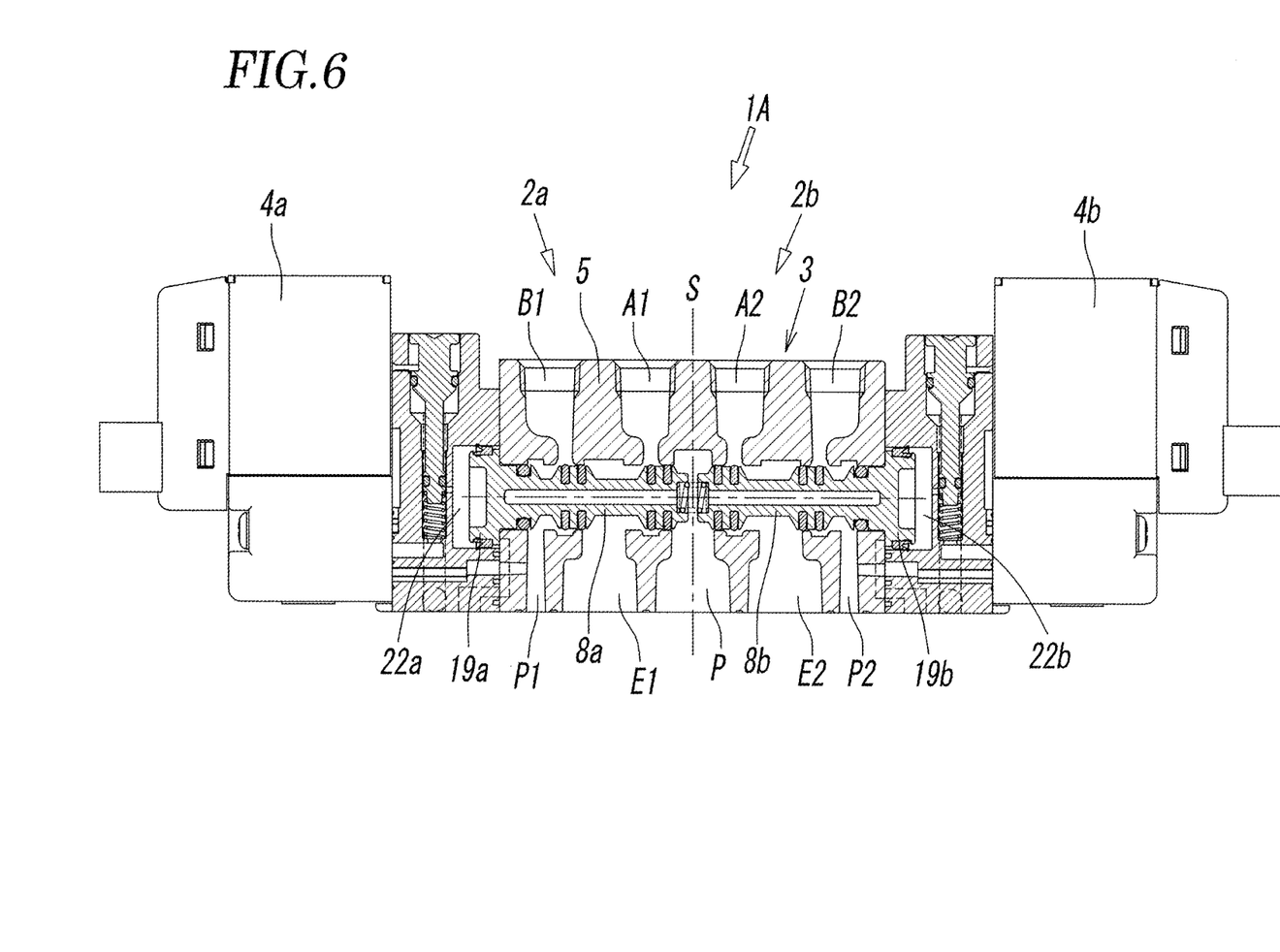
FIG. 6 is a sectional view of the electromagnetic valve illustrated in FIG. 1 in a state of operation in which the first and second pilot valves are powered.

When the first spool 8a is at the first switching position, as illustrated in FIG. 1, the main supply port P communicates with the first output port A1, the third output port B1 communicates with the first discharge port E1, and the first supply port P1 is closed. When the first spool 8a is at the second switching position, as illustrated in FIG. 6, the main supply port P is closed, the first output port A1 communicates with the first discharge port E1, and the first supply port P1 communicates with the third output port B1.

As with the first spool 8a, the second spool 8b is provided with a first seal member 31b that opens and closes a first supply passage 30b connecting the main supply port P and the second output port A2 to each other, a second seal member 33b that opens and closes a first discharge passage 32b connecting the second output port A2 and the second discharge port E2 to each other, a third seal member 35b that opens and closes a second discharge passage 34b connecting the fourth output port B2 and the second discharge port E2 to each other, a fourth seal member 37b that opens and closes a second supply passage 36b connecting the second supply port P2 and the fourth output port B2 to each other, and a fifth seal member 38b that isolates the first supply port P1 and the release chamber 23b from each other.

When the second spool 8b is at the first switching position, as illustrated in FIG. 1, the main supply port P communicates with the second output port A2, the fourth output port B2 communicates with the second discharge port E2, and the second supply port P2 is closed. When the second spool 8b is at the second switching position, as illustrated in FIG. 6, the main supply port P is closed, the second output port A2 communicates with the second discharge port E2, and the second supply port P2 communicates with the fourth output port B2.

The first and second pilot valves 4a and 4b each have a valve configuration as a 3-port electromagnetic valve. The first pilot valve 4a, one of the two, communicates with the first supply port P1 via a first pilot through hole 41a extending through the main body 5 and the first adaptor 6a. The second pilot valve 4b, the other of the two, communicates with the second supply port P2 via a second pilot through hole 41b extending through the main body 5 and the second adaptor 6b.

When the first and second pilot valves 4a and 4b are powered, pilot fluid is supplied from the first and second supply ports P1 and P2 into the pilot pressure chambers 22a and 22b, whereby the first and second spools 8a and 8b move to the second switching positions.

When the power supplied to the first and second pilot valves 4a and 4b is cut off, the pilot pressure chambers 22a and 22b are opened to the outside via the pilot valves 4a and 4b. Therefore, the force of the pressurized fluid in the return pressure chamber 17 and the force of the return spring 18 cause the first and second spools 8a and 8b to return to the first switching positions. If the return spring 18 is not provided, the first and second spools 8a and 8b return to the second switching positions only with the force of the pressurized fluid.

At the time of power failure or maintenance work, for example, the manual valves 25a and 25b provided in the respective adaptors 6a and 6b allow manual operation of the pilot valves 4a and 4b for establishing the state that is taken when the pilot valves 4a and 4b are powered. When the manual valves 25a and 25b are depressed, the pilot pressure chambers 22a and 22b and the first and second supply ports P1 and P2 directly communicate with each other, respectively, via manual communicating passages that are not illustrated and the through holes 24a and 24b.

According to the embodiment illustrated in the drawings, the valve hole 7, the first spool 8a and the second spool 8b, the main supply port P, the first output port A1 and the second output port A2, the first discharge port E1 and the second discharge port E2, the third output port B1 and the fourth output port B2, the first supply port P1 and the second supply port P2, and the first pilot valve 4a and the second pilot valve 4b are arranged symmetrically to each other with respect to a virtual plane S that extends through the center of the main supply port P and is orthogonal to the axis L of the valve hole 7. Note that they do not necessarily need to be exactly symmetrical to each other.

Figure 7:
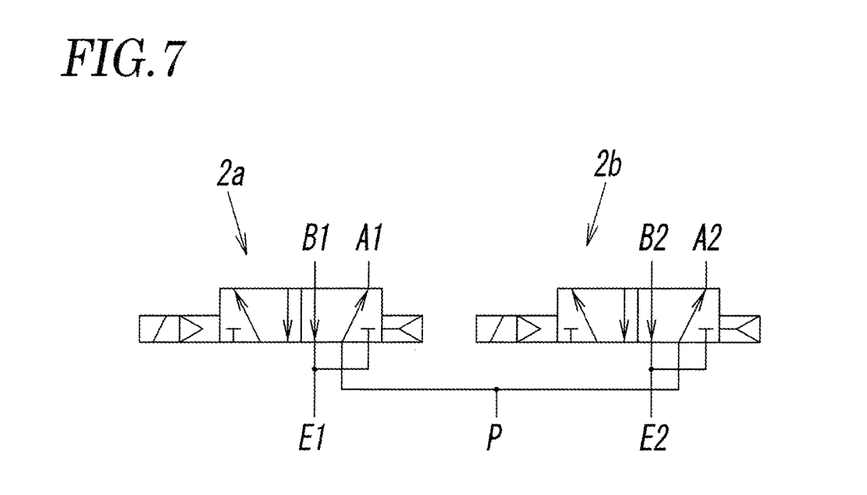
FIG. 7 is a diagram of the electromagnetic valve illustrated in FIG. 1 represented by symbols.

The above configuration of the dual 4-port electromagnetic valve 1A is represented by symbols in FIG. 7. Referring to FIG. 1, letting the left half of the electromagnetic valve 1A with respect to the virtual plane S be denoted as a first valve unit 2a and the right half of the electromagnetic valve 1A with respect to the virtual plane S be denoted as a second valve unit 2b, the first valve unit 2a and the second valve unit 2b are each regarded as a single-solenoid 4-port valve. Therefore, it can be said that two single-solenoid 4-port valves are combined into one electromagnetic valve 1A. In this case, the main supply port P and the return pressure chamber 17 are shared between the first valve unit 2a and the second valve unit 2b, and the return pressure chamber 17 also forms a part of the first supply passage 30a of the first valve unit 2a that connects the main supply port P and the first output port A1 to each other and a part of the first supply passage 30b of the second valve unit 2b that connects the main supply port P and the second output port A2 to each other.

Now, how the dual 4-port electromagnetic valve 1A operates will be described.

FIG. 1 illustrates a state of operation in which both of the first and second pilot valves 4a and 4b are not powered. In this state, the first and second spools 8a and 8b are at the respective first switching positions, pressurized fluid is output from the first and second output ports A1 and A2, the third and fourth output ports B1 and B2 are open to the outside via the first and second discharge ports E1 and E2, and the first and second supply ports P1 and P2 are closed.

Figure 4:
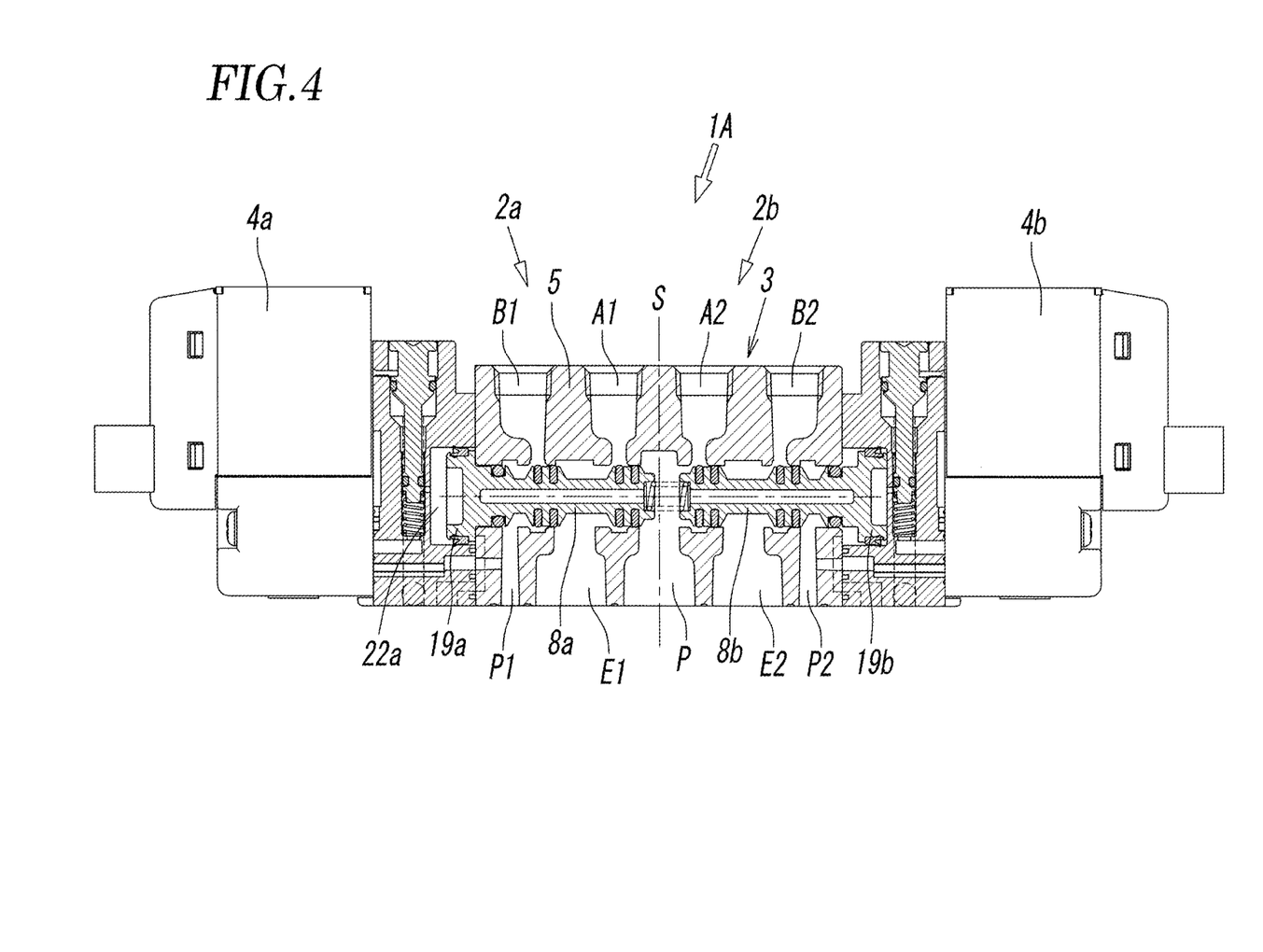
FIG. 4 is a sectional view of the electromagnetic valve illustrated in FIG. 1 in a state of operation in which the first pilot valve is powered.

When the first pilot valve 4a in the state illustrated in FIG. 1 is powered, pilot fluid is supplied into the first pilot pressure chamber 22a. Therefore, as illustrated in FIG. 4, the piston 19a is pushed toward the right side in the drawing, and the first spool 8a moves to the second switching position. Hence, in the first valve unit 2a, the first output port A1 is isolated from the main supply port P and communicates with the first discharge port E1, and the third output port B1 communicates with the first supply port P1. Accordingly, pressurized fluid is output from the third output port B1.

When the power supplied to the first pilot valve 4a is cut off, the first spool 8a returns to the first switching position illustrated in FIG. 1.

Figure 5:
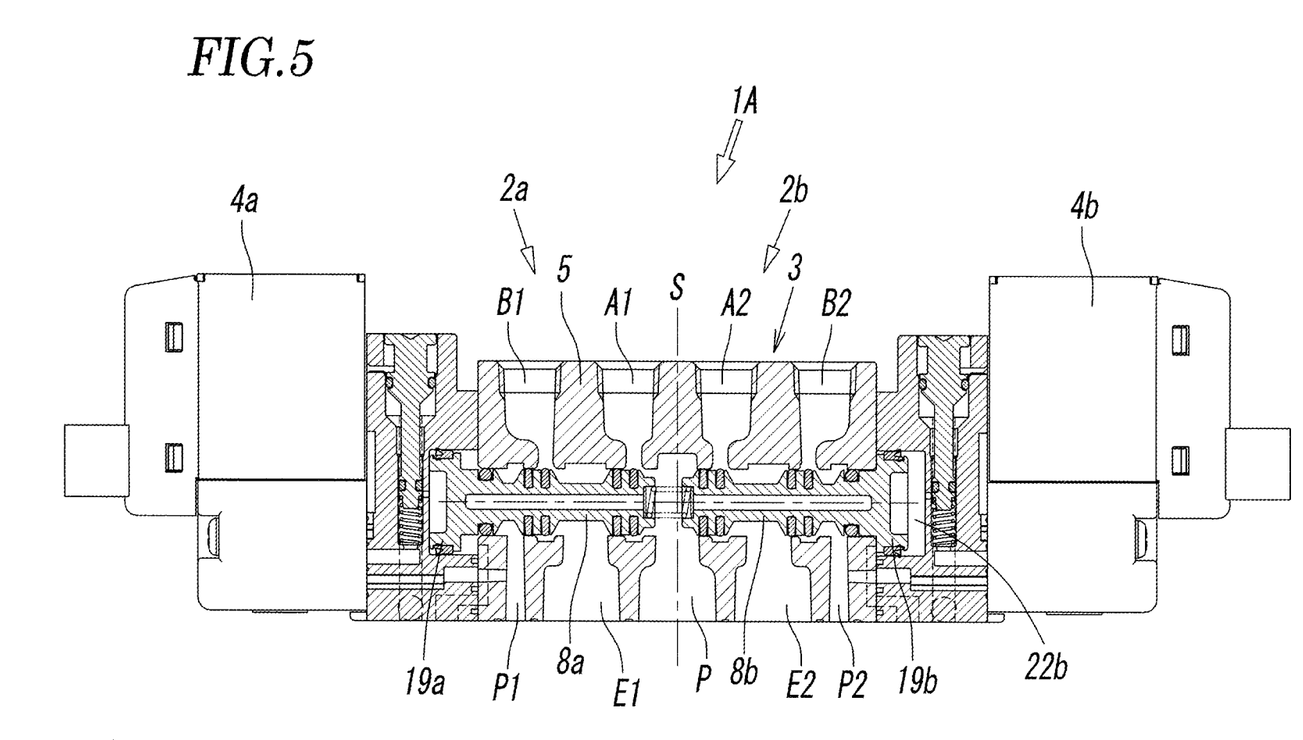
FIG. 5 is a sectional view of the electromagnetic valve illustrated in FIG. 1 in a state of operation in which the second pilot valve is powered.

When the second pilot valve 4b in the state illustrated in FIG. 1 is powered, pilot fluid is supplied into the second pilot pressure chamber 22b. Therefore, as illustrated in FIG. 5, the piston 19b is pushed toward the left side in the drawing, and the second spool 8b moves to the second switching position. Hence, in the second valve unit 2b, the second output port A2 is isolated from the main supply port P and communicates with the second discharge port E2, and the fourth output port B2 communicates with the second supply port P2. Accordingly, pressurized fluid is output from the fourth output port B2.

When the power supplied to the second pilot valve 4b is cut off, the second spool 8b returns to the first switching position illustrated in FIG. 1.

When the first and second pilot valves 4a and 4b in the state illustrated in FIG. 1 are both powered, pilot fluid is supplied into the first pilot pressure chamber 22a and into the second pilot pressure chamber 22b. Therefore, as illustrated in FIG. 6, the pistons 19a and 19b are pushed, and the first and second spools 8a and 8b both move to the second switching positions. Hence, the first and second output ports B1 and B2 are isolated from the main supply port P and communicate with the first and second discharge ports E1 and E2, respectively, and the third and fourth output ports A1 and A2 communicate with the first and second supply ports P1 and P2, respectively. Accordingly, pressurized fluid is output from the third and fourth output ports A1 and A2.

When the power supplied to the first and second pilot valves 4a and 4b is cut off, the first and second spools 8a and 8b return to the respective first switching positions illustrated in FIG. 1.

The dual 4-port electromagnetic valve 1A configured as above includes two single-solenoid 4-port valves that are combined into substantially one electromagnetic valve not by simply providing two 4-port valves in one valve body 3 but such that the main supply port P and the return pressure chamber 17 are shared between the first valve unit 2a and the second valve unit 2b. Furthermore, the return pressure chamber 17 is made to form a part of the first supply passage 30a of the first valve unit 2a and a part of the first supply passage 30b of the second valve unit 2b. Moreover, the supply port is divided into the main supply port P positioned at the center and the first and second supply ports P1 and P2 positioned on the left and right sides, respectively. Thus, a novel, rational design in which the configurations of two 4-port valves are related to each other is employed. Hence, the length of the electromagnetic valve 1A in the direction of the axis L can be made much shorter than in a case where two 4-port valves are simply provided in one valve body 3. Of course, the length of the electromagnetic valve 1A in the direction of the axis L can be made far shorter than in a case where separate two 4-port valves are mounted face to face on the base member 10A.

Figure 8:
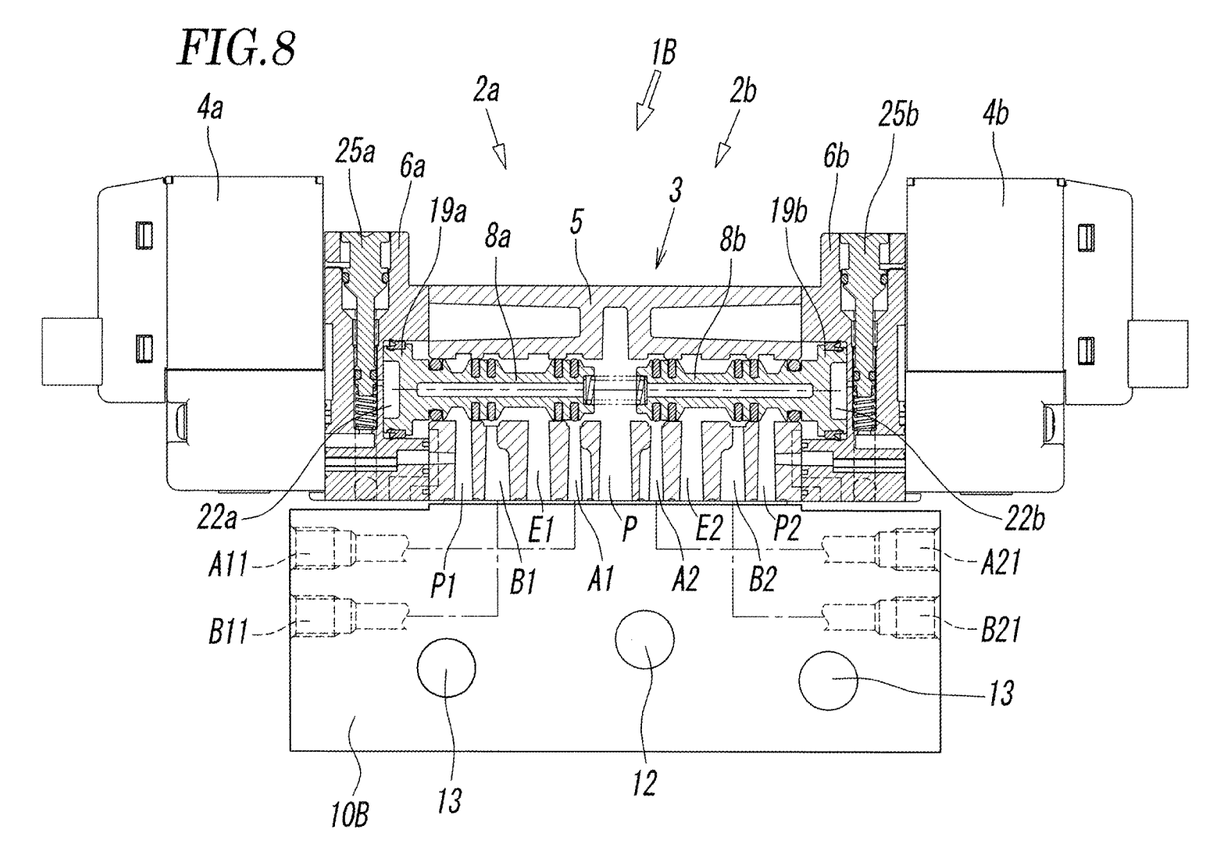
FIG. 8 is a sectional view of relevant elements of a dual 4-port electromagnetic valve according to a second embodiment of the present invention and illustrates a state where first and second pilot valves thereof are not powered.

FIG. 8 illustrates a dual 4-port electromagnetic valve according to a second embodiment of the present invention. An electromagnetic valve 1B according to the second embodiment is a base-piping electromagnetic valve in which pipes are connected to pipe-connection output ports A11, A21, B11, and B21, which are provided in a base member 10B on which the electromagnetic valve 1B is mounted, with pipe joints interposed therebetween. Hence, in the case of the electromagnetic valve 1B, the main supply port P, the first and second supply ports P1 and P2, the first to fourth output ports A1, A2, B1, and B2, and the first and second discharge ports E1 and E2 all have respective openings in the lower surface of the main body 5. When the electromagnetic valve 1B is mounted on the base member 10B, the main supply port P and the first and second supply ports P1 and P2 communicate with the supply through hole 12 provided in the base member 10B, the first and second discharge ports E1 and E2 communicate with the two respective discharge through holes 13 provided in the base member 10B, and the first to fourth output ports A1, A2, B1, and B2 communicate with the first to fourth pipe-connection output ports A11, A21, B11, and B21, respectively, provided on side faces of the base member 10B.

In the case illustrated in FIG. 8, the pipe-connection output ports A11 and B11 that communicate with the output ports A1 and B1 of the first valve unit 2a are provided on the left side face of the base member 10B, and the pipe-connection output ports A21 and B21 that communicate with the output ports A2 and B2 of the second valve unit 2b are provided on the right side face of the base member 10B.

Figure 9:
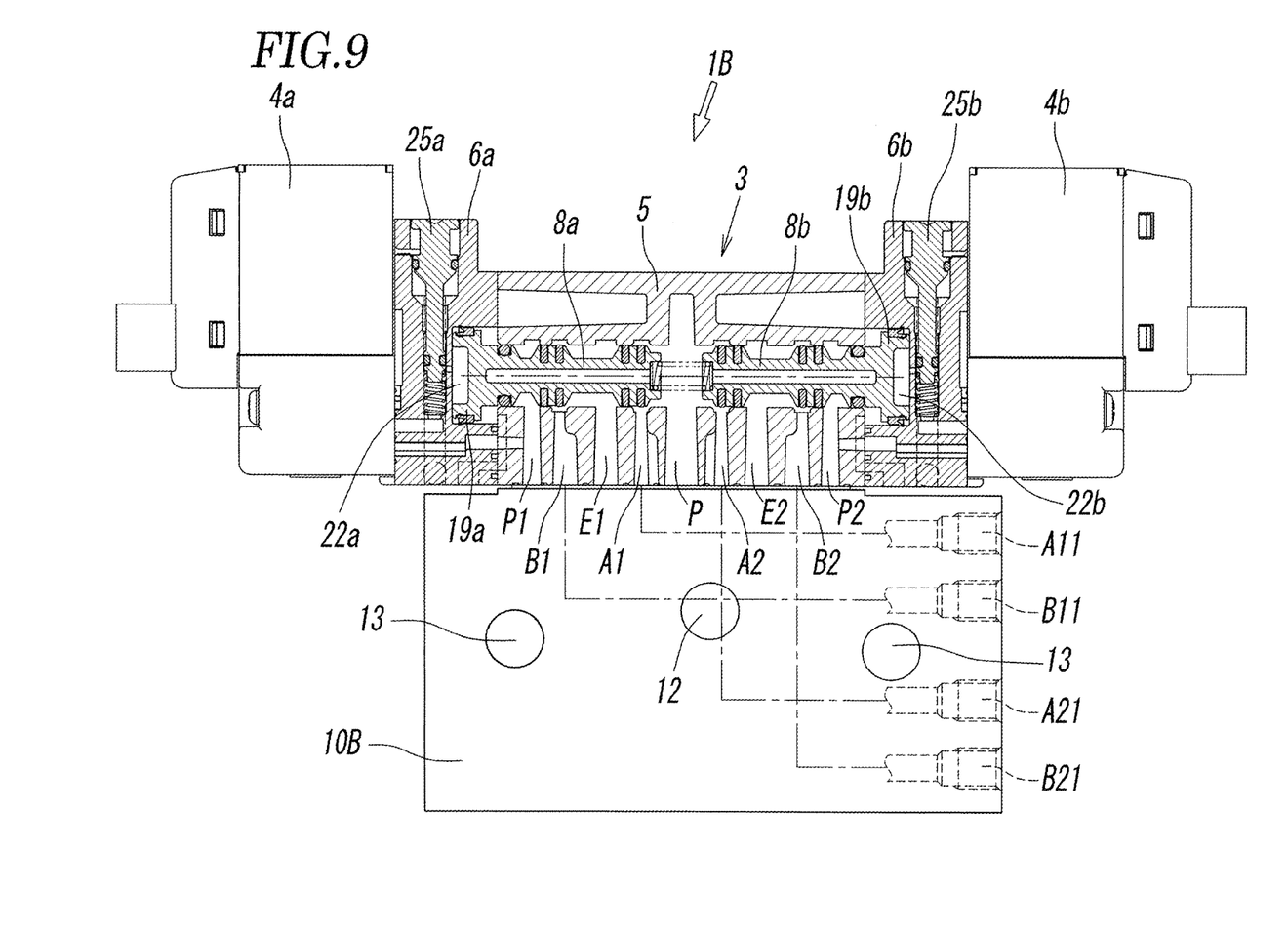
FIG. 9 is a sectional view of relevant elements of an electromagnetic valve according to a modification of the second embodiment that includes a base member having a configuration different from that illustrated in FIG. 8.

Alternatively, as in a modification illustrated in FIG. 9, all the pipe-connection output ports A11, A21, B11, and B21 may be concentratedly provided on the right or left side face of the base member 10B.

The configurations and functions according to the second embodiment and the modification thereof are substantially the same as those of the electromagnetic valve 1A according to the first embodiment, except those described above, and are not described herein. Instead, the main and same components of the both are numbered with the same reference numerals used in the first embodiment.

Figure 10:
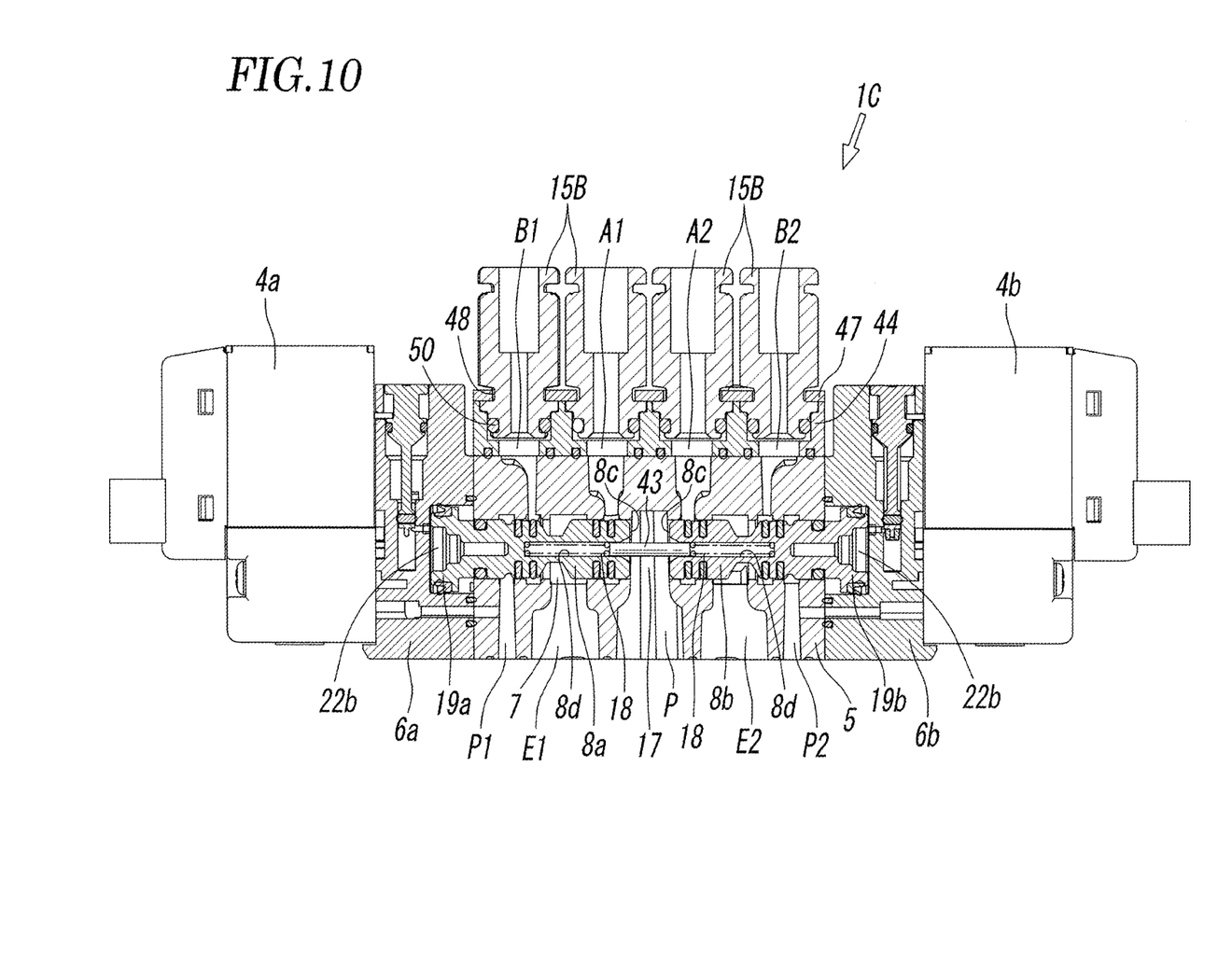
FIG. 10 is a sectional view of relevant elements of a dual 4-port electromagnetic valve according to a third embodiment of the present invention and illustrates a state where first and second pilot valves thereof are not powered.
Figure 11:
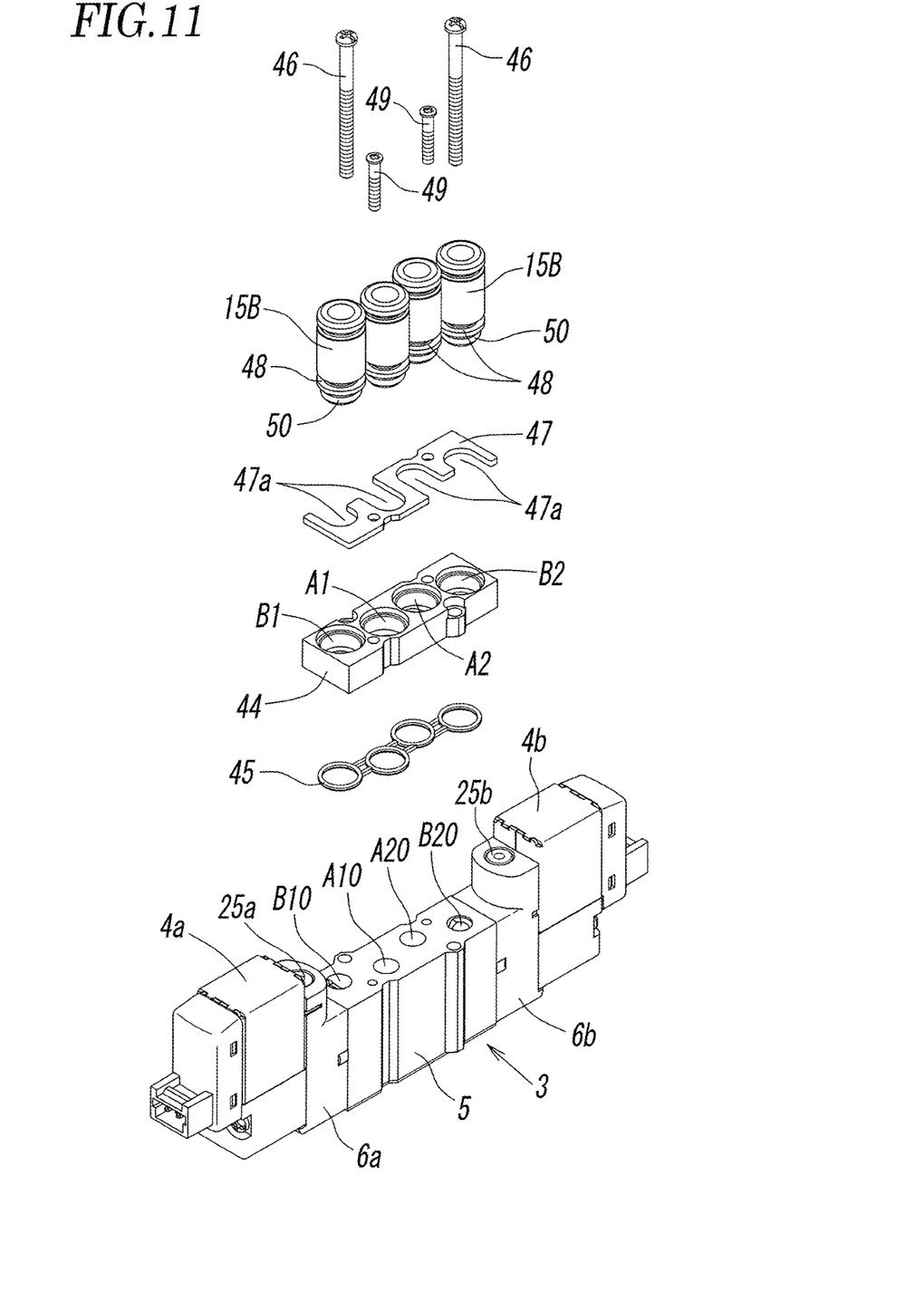
FIG. 11 is an exploded perspective view of a part of the electromagnetic valve illustrated in FIG. 10.

FIGS. 10 and 11 illustrate a dual 4-port electromagnetic valve according to a third embodiment of the present invention. An electromagnetic valve 1C according to the third embodiment differs from the electromagnetic valve 1A according to the first embodiment in the configuration for returning the two spools 8a and 8b to the respective first switching positions and in that the pipe joints attached to the output ports A1, A2, B1, and B2 are not the screw-type pipe joints 15A but insertion-type pipe joints 15B.

Hence, as illustrated in FIG. 10, the spools 8a and 8b have in the centers thereof respective center holes 8d that are bottomed holes extending from the respective leading-end surfaces 8c, and a columnar guide rod 43 extends over the two pistons 8a and 8b through the return pressure chamber 17 in such a manner as to be slidable in the center holes 8d. The return spring 18 in a compressed state is provided between each of two ends of the guide rod 43 and the bottom of a corresponding one of the center holes 8d of the spools 8a and 8b. The return springs 18 and the pressurized fluid in the return pressure chamber 17 act to return the spools 8a and 8b to the respective first switching positions.

Furthermore, to allow the insertion-type pipe joints 15B to be attached, as can be seen from FIG. 11, a port block 44 having the first to fourth output ports A1, A2, B1, and B2 is attached with screws 46 to the upper end surface of the main body 5 of the valve body 3 of the electromagnetic valve 1C with a gasket 45 interposed therebetween, and the output ports A1, A2, B1, and B2 communicate with the valve hole 7 via first to fourth output through holes A10, A20, B10, and B20, respectively, provided in the main body 5. The port block 44 forms a part of the valve body 3.

The insertion-type pipe joints 15B are attached to the output ports A1, A2, B1, and B2, respectively, with the aid of one attaching plate 47. The attaching plate 47 has four recesses 47a in which the pipe joints 15B are fitted, respectively. The pipe joints 15B are fitted in the respective recesses 47a, and the edges of the recesses 47a are locked in respective locking grooves 48 provided in the outer peripheries of the pipe joints 15B. In this state, the attaching plate 47 is fixed to the upper surface of the port block 44 with screws 49, whereby the pipe joints 15B are attached to the respective output ports A1, A2, B1, and B2 while being prevented from coming off the output ports A1, A2, B1, and B2. Reference numeral 50 given in the drawing denotes an O ring that seals the gap between the outer periphery of each of the pipe joints 15B and the inner periphery of a corresponding one of the output ports A1, A2, B1, and B2.

The other configurations and functions of the electromagnetic valve 1C according to the third embodiment are substantially the same as those of the electromagnetic valve 1A according to the first embodiment and are not described herein. Instead, the main and same components of the both are numbered with the same reference numerals used in the first embodiment.

The configuration for returning the two spools 8a and 8b of the electromagnetic valve 1C to the respective first switching positions is also applicable to the electromagnetic valve 1A according to the first embodiment and to the electromagnetic valve 1B according to the second embodiment.

Conversely, the configuration for returning the two spools 8a and 8b of the electromagnetic valve 1C to the first switching positions may be the same as that of the electromagnetic valve 1A according to the first embodiment.

Figure 12:
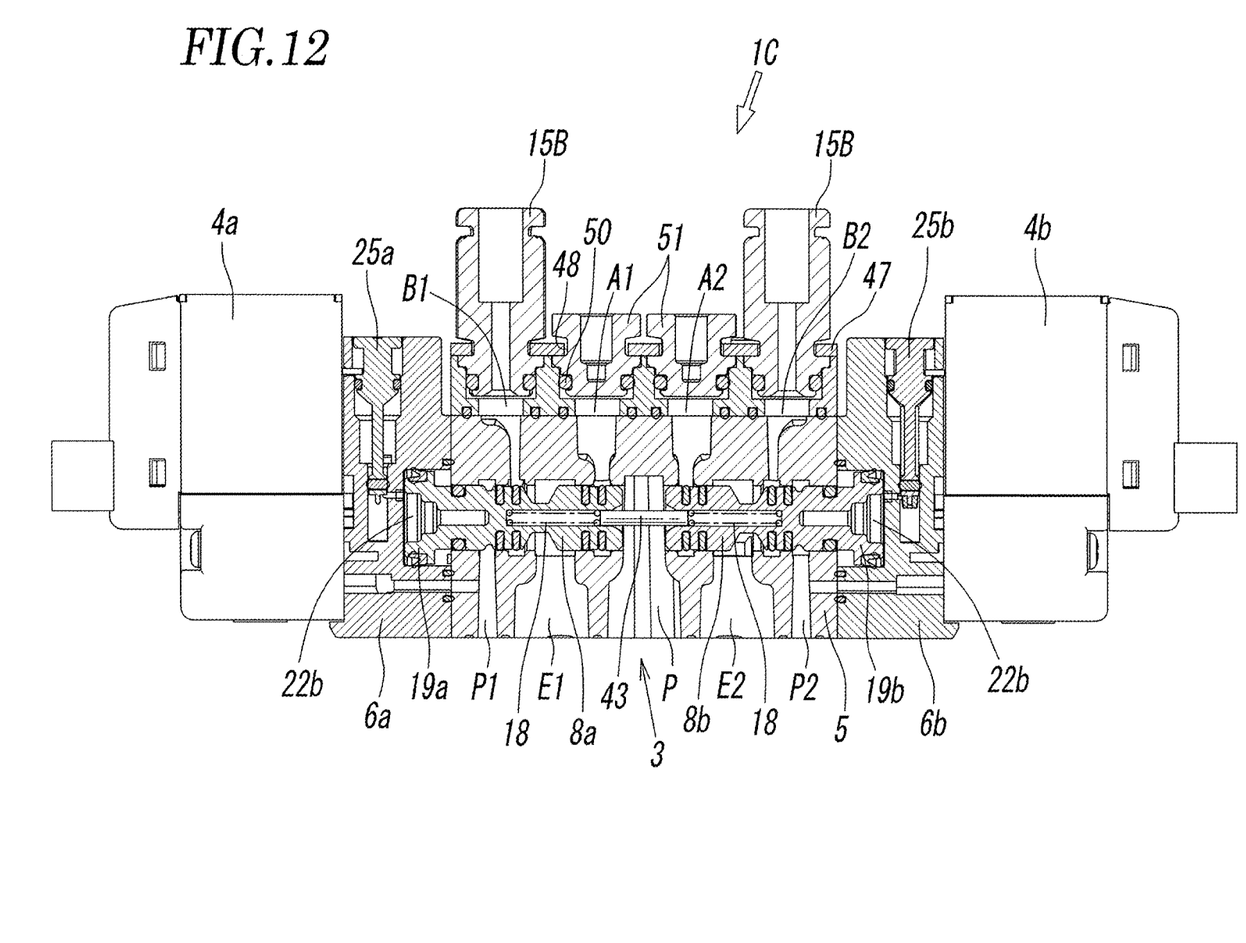
FIG. 12 is a sectional view of a first application of the electromagnetic valve illustrated in FIG. 10.
Figure 13:
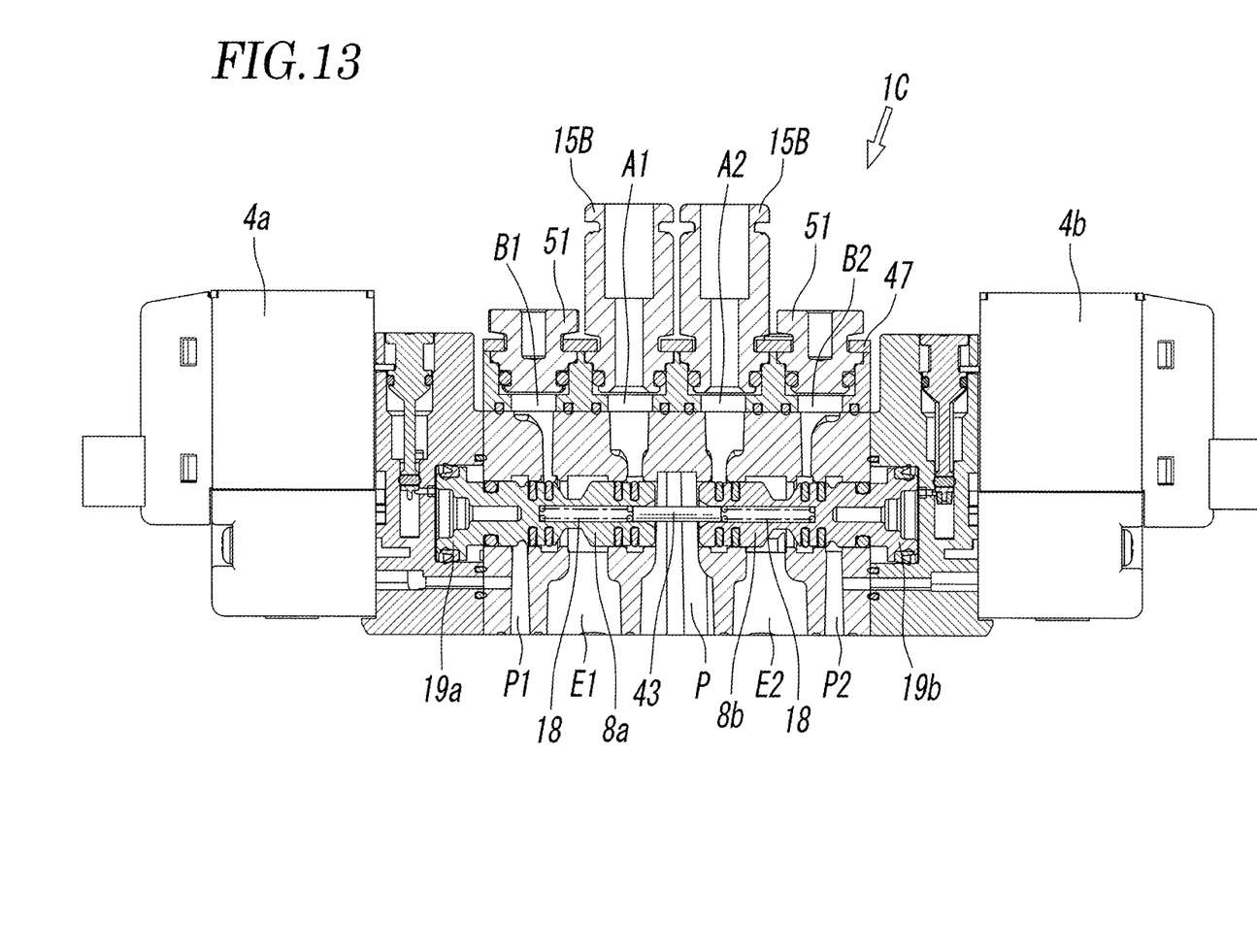
FIG. 13 is a sectional view of a second application of the electromagnetic valve illustrated in FIG. 10.

FIGS. 12 and 13 illustrate applications of the electromagnetic valve 1C according to the third embodiment.

In a first application illustrated in FIG. 12, the first and second output ports A1 and A2 are closed by port plugs 51 and are not usable, whereas the third and fourth output ports B1 and B2 are provided with the pipe joints 15B and are usable.

As with the pipe joints 15B, the port plugs 51 have locking grooves 48 at which the edges of the recesses 47a of the attaching plate 47 are locked, respectively. The port plugs 51 are also provided with O rings 50, respectively. The port plugs 51 are attached to the output ports A1 and A2 with the aid of the attaching plate 47, along with the pipe joints 15B for the third and fourth output ports B1 and B2.

Thus, the electromagnetic valve 1C has substantially the same configuration as a combination of two 3-port valves. Moreover, the electromagnetic valve 1C has a function as a normally closed 4-position valve in which the first and second supply ports P1 and P2 are closed in a normal state where the first and second pilot valves 4a and 4b are not powered.

In a second application illustrated in FIG. 13, the third and fourth output ports B1 and B2 are closed by the port plugs 51 and are not usable, whereas the first and second output ports A1 and A2 are provided with the pipe joints 15B and are usable. Hence, the second application has a function as a normally open 4-position valve in which the main supply port P communicates with the first and second output ports A1 and A2 in the normal state.

The usage according to the first or second application is also applicable to the electromagnetic valve 1A according to the first embodiment and to the electromagnetic valve 1B according to the second embodiment. In the case of the electromagnetic valve 1A according to the first embodiment, output ports that are not to be used only need to be selectively closed by using screw-type port plugs. In the case of the electromagnetic valve 1B according to the second embodiment, any of the pipe-connection output ports A11, A21, B11, and B21 provided in the base member 10B only need to be closed by using screw-type or insertion-type port plugs that fit the form of the output ports.

REFERENCE SIGNS LIST 1A, 1B, 1C electromagnetic valve
3 valve body
4a, 4b pilot valve
7 valve hole
8a, 8b spool
17 return pressure chamber
19a, 19b piston
41a, 41b pilot through hole
P main supply port
P1 first supply port
P2 second supply port
A1 first output port
A2 second output port
B1 third output port
B2 fourth output port
E1 first discharge port
E2 second discharge port
S virtual plane
L axis

The invention claimed is:

1. A dual 4-port electromagnetic valve comprising: one valve hole provided in a valve body; a first spool and a second spool that are housed in the valve hole in such a manner as to be slidable independently of each other; a first pilot valve and a second pilot valve that are of a solenoid-operated type and drive the first spool and the second spool, respectively, with an action of pilot fluid; a main supply port that communicates with the valve hole at a position where the first spool and the second spool face each other; a first output port and a second output port that communicate with the valve hole on two respective sides of the main supply port; a first discharge port and a second discharge port that communicate with the valve hole on two respective outer sides of the first output port and the second output port; a third output port and a fourth output port that communicate with the valve hole on two respective outer sides of the first discharge port and the second discharge port; and a first supply port and a second supply port that communicate with the valve hole on two respective outer sides of the third output port and the fourth output port, wherein the main supply port and each of the first supply port and the second supply port communicate with each other, wherein positions of the first spool and the second spool each include a first switching position taken when a corresponding one of the first pilot valve and the second pilot valve is not powered, and a second switching position taken when the corresponding one of the first pilot valve and the second pilot valve is powered, wherein, when the first spool is at the first switching position, the main supply port communicates with the first output port, the third output port communicates with the first discharge port, and the first supply port is closed, wherein, when the first spool is at the second switching position, the main supply port is closed, the first output port communicates with the first discharge port, and the first supply port communicates with the third output port, wherein, when the second spool is at the first switching position, the main supply port communicates with the second output port, the fourth output port communicates with the second discharge port, and the second supply port is closed, and wherein, when the second spool is at the second switching position, the main supply port is closed, the second output port communicates with the second discharge port, and the second supply port communicates with the fourth output port.

2. The dual 4-port electromagnetic valve according to claim 1, wherein a return pressure chamber that is shared between the first spool and the second spool is provided at a position where the valve hole communicates with the main supply port, and pistons on which pilot-fluid pressures from the first pilot valve and the second pilot valve act, respectively, are each provided at an end of a corresponding one of the first spool and the second spool on a side opposite a side facing the return pressure chamber.

3. The dual 4-port electromagnetic valve according to claim 2, wherein the return pressure chamber forms a part of a passage that connects the main supply port and the first output port to each other and a part of a passage that connects the main supply port and the second output port to each other.

4. The dual 4-port electromagnetic valve according to claim 1, wherein the first pilot valve is provided at one end of the valve body, the second pilot valve is provided at another end of the valve body, the first pilot valve communicates with the first supply port via a first pilot through hole, and the second pilot valve communicates with the second supply port via a second pilot through hole.

5. The dual 4-port electromagnetic valve according to claim 4, wherein each pair of the first spool and the second spool, the first output port and the second output port, the first discharge port and the second discharge port, the third output port and the fourth output port, the first supply port and the second supply port, and the first pilot valve and the second pilot valve are arranged symmetrically to each other with respect to a virtual plane extending through a center of the main supply port and that is orthogonal to an axis of the valve hole.

6. The dual 4-port electromagnetic valve according to claim 1, wherein the first to fourth output ports are selectively closable.

7. The dual 4-port electromagnetic valve according to claim 1, wherein the first spool, the main supply port and the first supply port, the first output port and the third output port, the first discharge port, and the first pilot valve together form a first valve unit that is a 4-port valve; and the second spool, the main supply port and the second supply port, the second output port and the fourth output port, the second discharge port, and the second pilot valve together form a second valve unit that is a 4-port valve, and wherein the first valve unit and the second valve unit are provided on one side and another side, respectively, of the valve body while sharing the main supply port and with the main supply port positioned in between.

8. The dual 4-port electromagnetic valve according to claim 7, wherein the first to fourth output ports are selectively closable; wherein, when one of the first output port and the third output port is closed, the first valve unit serves as a 3-port valve; and, when one of the second output port and the fourth output port is closed, the second valve unit serves as a 3-port valve.

* * * * *